UNITED STATES PATENT OFFICE.

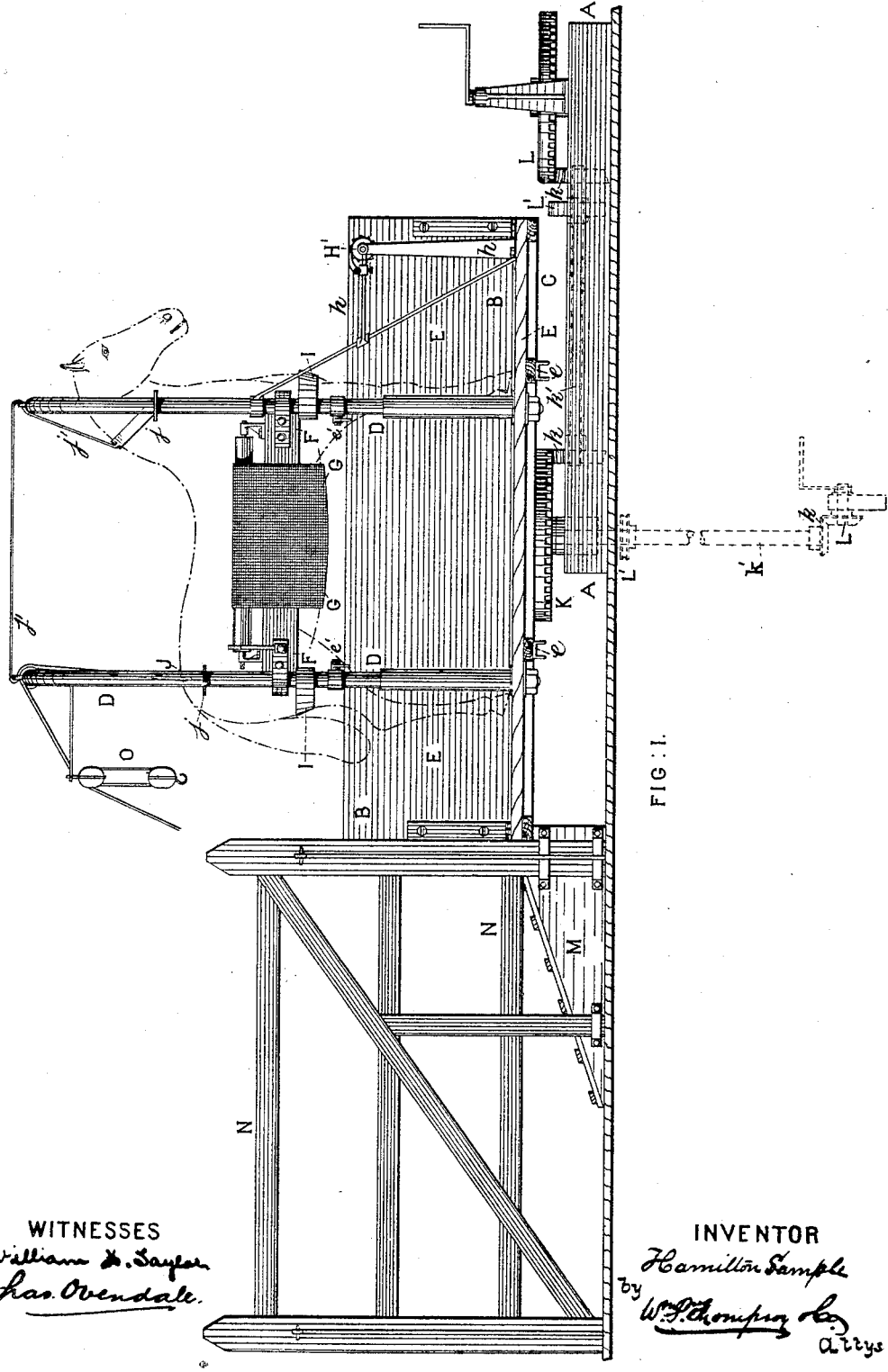

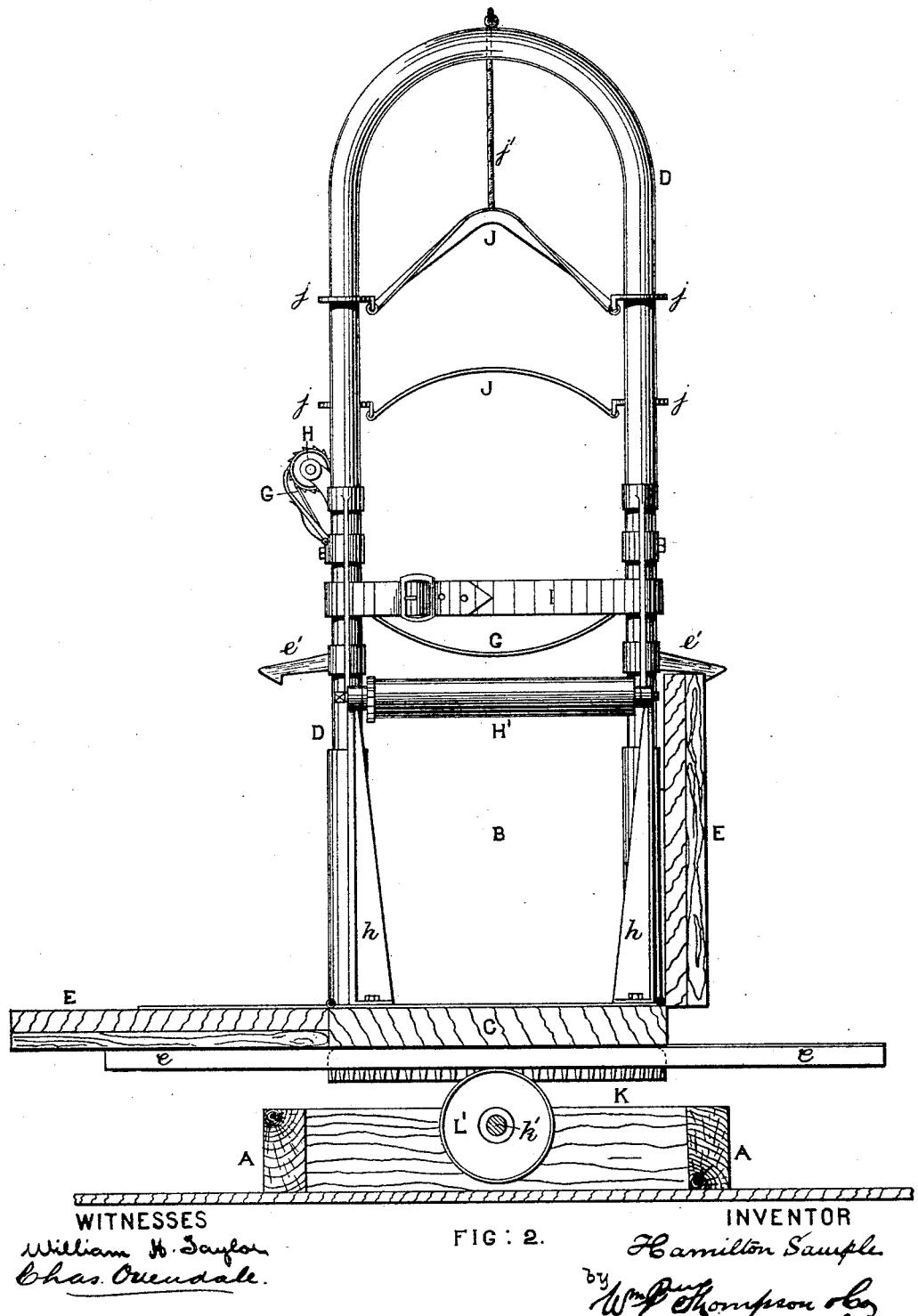

HAMILTON SAMPLE, OF BRIGHTON, ENGLAND.

APPARATUS FOR TREATING OR TAMING HORSES.

SPECIFICATION forming part of Letters Patent No. 453,727, dated June 9, 1891.

Application filed November 19, 1890. Serial No. 371,972. (No model.) Patented in England April 18, 1890, No. 5,885.

*To all whom it may concern:*

Be it known that I, HAMILTON SAMPLE, a citizen of the United States, residing at No. 19 Charles Street, Brighton, in the county of Sussex, England, have invented certain new and useful Improvements in Apparatus for Treating or Taming Horses, (for which I have obtained Letters Patent in Great Britain, No. 5,885, bearing date April 18, 1890,) of which the following is a specification.

It is well known to those accustomed to training or breaking in horses that it is necessary to obtain complete control over the horse, in order that he may lose confidence in his own powers and feel himself perfectly in the power of the person operating upon him before he learns to do or submit to what is required of him; and it is at the present time very customary to throw a horse down and prevent his rising or other actions by strapping up his legs to deprive him of his full powers. These methods are not complete for the purposes for which they are intended, as they do not fully deprive him of control over his actions, while at the same time they may have other effects on the animal neither beneficial nor intended.

My invention is designed to obtain control or mastery over a horse by depriving him altogether of the power of directing his actions without subjecting him to any unnecessary shock or severity of treatment.

It consists, essentially, in a stall-shaped box or cage fixed on a raised platform, so that it can be rapidly rotated in either direction, in which the animal is placed, and in which he is rotated at a greater or less velocity until he becomes passive in the operator's hands.

It will be fully described with reference to the accompanying drawings.

Figure 1 is a side elevation of the apparatus with one side E removed; Fig. 2, an end elevation of same, drawn to an enlarged scale.

Upon a frame-work A, forming a stage or platform, I pivot a stall or cage B, into which the horse is placed. The floor or bottom C of the stall is surmounted by two arched uprights or rails D, and to it are hinged two sides E, which can be placed vertically or horizontally, as desired. Each of the arched uprights D is sufficiently wide at the base and of such a height to the arched top as to allow a horse to pass under it. At each side of the stall a rod or bar F is attached to the uprights D to give rigidity to the uprights and to carry a supporting-girth G. The girth G is firmly attached to the bar F at one side, and at the other side is attached to a rotating bar or roller H, upon which it can be rolled up by means of a winch-handle or the like. The roller H is supported in sockets on the bar F, and is provided at one end with a ratchet and pawl to prevent it turning back when weight is put upon the girth G. If found more convenient, the girth G may be attached to a roller on both sides, so that it may be manipulated from either side of the stall. By means of the girth G the horse can be supported when in the stall, or, if desired, raised off his feet thereby. At the front of the stall is placed a second roller or winch H', to which a rope or rein from a halter or bridle on the horse's head is connected, and by which his head can be drawn forward and secured, as may be required. The roller H' may be supported by struts or frames $h$, or by the hinged sides E when these are vertical. To the uprights D are affixed straps I, which buckle across, one in front of the fore legs of the horse and the other behind the hind legs, to prevent any forward or backward movement, and to the same uprights are connected adjustable straps or bands J, one of which coming across the back of the neck prevents the horse rearing and the other across the rump prevents the horse kicking. The adjustable straps J are attached to the uprights D by rings or grommets $j$ sliding thereon, and are held up out of contact with the horse by the cord $j'$.

The sides E of the stall are hinged to the bottom of the floor C, so that they may be placed in either a vertical or horizontal position, as may be required. When laid down in a horizontal position, they are supported on the rails $e$, and when closed or vertical are maintained in an upright position by the pivoted catches $e'$.

The stall B is pivoted on the platform or stage A, preferably on ball-bearings, and rotary motion is applied by means of a cog-wheel K, secured to the under side of the stall B, which receives motion from the intermediate cogs $k$ on the shaft $k'$ and the cog-wheel L, or it may be driven by a strap on the pulley L'. Instead of the horizontal shaft $k'$, a vertical shaft may pass through the floor and be actuated from beneath, as shown in dotted lines, Fig. 1.

At the rear of the stall is placed an inclined approach M, with side wings N, by means of which the horse enters the stall B. A block and tackle O may be used to attach to the horse's hind legs for shoeing purposes or surgical operations.

In operating upon or treating horses by this invention the animal is placed in or caused to enter the stall B, and is secured therein by the straps I being buckled before and behind the fore and hind legs, respectively, and the head being made fast by a rope from the halter to the winch H'. The adjustable straps J are lowered down upon the neck and rump of the horse and the girth G is tightened under the belly to support his weight or raise him off his feet, and the hinged sides E are raised up into a vertical position. The apparatus is then rotated at a greater or less velocity for some time, when he will cease to attempt to move, struggle, or free himself and will be perfectly subdued. When the horse is quiet, the sides of the cage may be lowered onto the supporting-rails $e$ and his head released, and after being thus operated upon he may be treated by the trainer while in the stall in any way he chooses, to train his different senses of touch, sight, hearing, smell, or taste, or may be surgically or otherwise operated upon.

Although the invention is herein described in connection with horses, it will be understood that it may be applied to other animals which man may wish to train, subdue, or tame.

I am well aware that horses have been suspended in their stalls to prevent them falling during sleep or to remove their weight from their legs when weak through illness or surgical operations, and such forms no part of my invention; but

What I claim as my invention, and desire to protect by Letters Patent, is—

1. An apparatus for treating or taming horses, consisting of a stall in which the animal is placed, which is capable of rotating about a pivot, a vertical shaft or pivot upon which the stall is supported and about which it rotates, and mechanism for rotating the stall, substantially as and for the purpose described.

2. In apparatus for treating or taming horses, the combination of the stall B, in which the animal is placed, the vertical pivot, the stationary platform or base A, and the driving-shaft and wheels, substantially as described and shown.

3. In apparatus for treating or taming horses, the combination, with the stationary platform A, shaft $k'$, and wheels K and L, of the pivoted stall B, with wheel K, uprights D, girth G, and straps J, substantially as and for the purposes described.

4. In apparatus for treating or taming horses, the combination, with the pivoted stall B, of the uprights D and pulley-blocks O, substantially as and for the purposes described.

5. In apparatus for treating or taming horses, the combination of the stationary platform A, the pivoted stall B, the uprights D, the supports F, the girth G, the straps J, and straps I, substantially as and for the purposes described.

In testimony whereof I have signed my name to this specification, in the presence of two subscribing witnesses, this 1st day of November, 1890.

HAMILTON SAMPLE.

Witnesses:
 THOMAS H. MELLOR,
 JAMES F. MELLOR.